Patented May 10, 1938

2,116,931

UNITED STATES PATENT OFFICE 2,116,931

PROCESS FOR THE RECOVERY OF LACTOSE FROM WHEY

Abraham Leviton, Washington, D. C., assignor to Secretary of Agriculture of the United States of America No Drawing. Application April 16, 1937, Serial No. 137,285

2 Claims. (Cl. 127—31)

(Granted under the act of March 3, 1883, as amended April 30, 1928; 370 O. G. 757)

This application is made under the act of March 3, 1883, as amended by the act of April 30, 1928, and the invention herein described and claimed may be used by or for the Government of the United States or any of its officers and employees, in the prosecution of work for the Government, without the payment to me of any royalty thereon.

When the casein is removed from milk by the action of rennet, as in cheese making, or by acid, as in making cottage cheese or casein, the whey remaining contains small amounts of fat which may be removed by centrifugal separation, leaving a clear solution containing lactose (4.6–5.0%), salts (0.37–0.65%), and soluble proteins (0.80–0.95%).

The lactose in the whey has a commercial value. The proteins have a commercial value. The lactoflavin contained in the whey in minute quantities possesses a potential commercial value.

In the commercial manufacture of lactose, the usual procedure is to coagulate the greater part of the protein by heat, separate the precipitate by decantation, and filtration, and concentrate the filtrate under vacuum until the lactose crystallizes. The crystals are removed by centrifuging, and are purified by a second crystallization. By this method about 50% of the sugar is recovered. The proteins are denatured by the heating, and are no longer soluble.

It is possible to adjust the reaction and temperature so that the sugar can be crystallized without removing the protein, and without rendering it insoluble. If this is done the mother liquor, after removal of the sugar, may be dried to a powder, usually designated as whey protein powder, containing 37–52% lactose, 32–45% protein, and 12–18% ash. Some of the salts may be removed from this powder by dialyzing, thus increasing the proportion of protein and lactose.

It would be advantageous from a commercial standpoint to develop a process so that (1) a greater yield of lactose would be obtained; (2) a lactose of high purity would be obtained as a result of but one crystallization; and (3) the protein could be separated from part of the lactose and salts without impairing its solubility, and nutritive properties.

I have discovered that any or all of these ends may be obtained by treating raw, concentrated or dried whey with an alcohol-water solution. My invention is based upon the following observations:

(1) If to an aqueous solution containing lactose, sufficient alcohol is added to precipitate most of the lactose, there is a lag between the time of the addition of the alcohol, and the precipitation of the lactose. The resulting solution, in other words, remains supersaturated with respect to the lactose for an appreciable interval.

(2) The lactose in the powder derived from milk, and milk derivatives, exists in an amorphous rather than a crystalline form. In other words, the lactose in these powders is present in a highly concentrated aqueous solution. This state of the lactose is commonly designated as the glassy state, and for all practical purposes, the lactose in this state may be considered to be in solution; and consequently the powders containing lactose in this state may be considered to contain the lactose in solution.

(3) Alcohol-water mixtures, containing the solid ingredients of whey, when sufficiently high in their alcoholic content, will contain the protein ingredients of whey in an insoluble, undenatured state. The protein may be readily recovered from these mixtures, and may readily be resuspended in water to give a stable suspension.

(4) These alcohol-water mixtures will dissolve the salts contained in whey to such an extent that the saltiness of whey powder or of whey protein powder may be considerably reduced.

(5) The solubility in alcohol of the protein and of the calcium salts of whey may be increased by the addition of small quantities of hydrochloric acid.

I make use of any or all of these observations in my invention. For example, I find that at room temperature, a solution containing four parts by volume of 95% alcohol, and one part by volume of water, when added to ten parts by weight of whey powder, dissolves apparently a much larger portion of lactose than that sufficient to form a saturated solution. The stability of this supersaturated solution is great enough to permit of its filtration from any undissolved material. I also find that the same alcohol-water solution dissolves very little protein, and leaves the undissolved whey protein undenatured. I find further that the salts responsible for the saltiness of the whey powder are partly removed by the same alcohol-water mixtures.

This experiment may be repeated, and whey protein powder may be used instead of whey powder with substantially the same results as cited above. The experiment may be repeated again, and skim milk powder may be used instead of whey powder with substantially the same results.

The casein contained in the skim milk powder, however, is denatured.

These experiments may be modified in order that raw and concentrated whey, whey protein powder solutions, and skim milk may be used instead of the corresponding powders.

Under these circumstances, sufficient 95% alcohol is added to give the proportions of alcohol and water cited in the discussion of the treatment of the various powders.

The ratio of alcohol to water cited is the ratio at room temperature, above which the whey protein remains undenatured and below which it becomes denatured. I find that the results of these experiments may be employed separately or in combination, in order to recover from raw, concentrated and dried whey, from raw, concentrated and dried skim milk, and from whey protein powder and solutions containing it:

(1) Lactose of a high degree of purity as a result of a single crystallization in yields greater than obtained by other methods.

(2) Lactose containing $\alpha$ lactose and $\beta$ lactose in a finely divided form in substantially the same proportions as in an equilibrium mixture.

Solvent regeneration in the case of the extraction from powders depends only upon filtration and acid neutralization in the event that lactose recovery is the primary consideration.

In the case of solvent regeneration by filtration there results in the mother liquor, upon its successive application, a gradual enrichment of its lactoflavin content, a fact which no doubt could be utilized to great advantage commercially.

It is also obvious that the invention is not necessarily limited to the use of alcohol-water solutions as a solvent. Other liquids miscible with water and forming solutions with water in which lactose and the whey protein are sparingly soluble may evidently be used. I prefer to use alcohol because of its low cost, its non-toxicity and its accessibility. It is also obvious that the invention is not necessarily limited to the use of alcohol-water mixtures in the proportions and at the temperature cited above and below. It is sufficient that the quantity of alcohol used should be great enough at any temperature to yield a solution which will not denature the lactalbumin and in which the lactose and protein are sparingly soluble.

The following are examples of the process under discussion:

(1) 100 grams of spray dried whey powder containing 66% lactose and approximately 13.5% nitrogenous material calculated as albumin were stirred for three minutes in a solution consisting of 1430 c. c. of 95% alcohol and 357 c. c. of water. On filtration, a filtrate was obtained containing 3.38 grams lactose per 100 c. c. filtrate. On the basis of complete recovery of solvent, the amount of lactose extracted represented 93.5% of the lactose contained in the whey powder. The filtrate was acidified with 0.75 volume per cent of a 2N solution of HCl in absolute alcohol in consequence of which the pH of the filtrate was lowered from 5.38 to 3.63. The lactose crystallized out of the filtrate in an amount representing 80% of the lactose in the filtrate or 75% of the lactose in the whey. One part of these crystals, after washing with 4 parts of an alcoholic solution containing 4 parts 95% alcohol to one part water, contained approximately 0.02% nitrogen, and 0.1% sulfated ash, gave a clear aqueous solution, and showed only a slight tendency to foam on boiling.

(2) 30 grams of the same whey powder described in (1) were stirred in three liters of 95% alcohol at 60° C. for one minute. On filtration, a filtrate was obtained containing 0.465 gram lactose per 100 c. c. filtrate. On the basis of complete recovery of solvent the amount of lactose extracted represented 70% of the lactose contained in the whey powder. The filtrate was acidified with 0.25 volume per cent of a 2N solution of HCl in absolute alcohol. The purpose of acidification as given in this and the previous example was to increase the solubility in alcohol of the protein and calcium salts contained in whey, and in this way prevent the separation of small quantities of these materials with the lactose. The lactose crystallized out of the filtrate in an amount representing 65% of the lactose in the whey powder. One part of this finely divided lactose when washed with 10 parts 95% alcohol contained considerably less than 0.02% nitrogen, and 0.07% ash, dissolved rapidly in cold water, gave a clear aqueous solution, and showed no tendency to foam on boiling. Upon analysis, the sugar was found to contain 1.3 parts of $\beta$ lactose to 1 part of $\alpha$ lactose.

(3) When untreated or concentrated whey is used, alcohol is added to give the proper ratio of alcohol and water. In the following example 58 grams of concentrated whey containing 20 grams solids, were mixed with 285.6 c. c. 95% alcohol, and 167.0 c. c. water. On filtration, a filtrate was obtained containing 4.00 grams lactose per 100 c. c. filtrate. On the basis of complete recovery of solvent, the amount of lactose extracted represents 96.5% of the lactose contained in the whey. The filtrate was acidified with 0.75% volume per cent of a 2N solution of HCl in absolute alcohol. The lactose crystallized out of the filtrate in an amount representing 77% of the lactose in the whey. One part of these crystals, after washing with 4 parts of an alcoholic solution containing 4 parts 95% alcohol to 1 part water, contained 0.02% nitrogen, and gave a solution which showed no tendency to foam on boiling.

Having fully described my invention, what I claim is:

1. A process for the recovery of lactose from whey, which comprises adding to whey, at room temperature, sufficient alcohol and water to yield a mixture containing at least 4 parts of 95% alcohol by volume to 1 part of water, thence agitating the mixture, thence immediately filtering, and thence acidifying the filtrate and recovering the lactose.

2. A process for the recovery of lactose from skim milk, which comprises adding to skim milk, at room temperature, sufficient alcohol and water to yield a mixture containing at least 4 parts of 95% alcohol by volume to 1 part of water, thence agitating the mixture, thence immediately filtering, and thence acidifying the filtrate and recovering the lactose.

ABRAHAM LEVITON.